Jan. 26, 1965 W. V. HOUGH 3,167,559
PREPARATION OF TETRABORANE(6) ADDUCTS
Original Filed Feb. 8, 1960 2 Sheets-Sheet 1

INVENTOR.
WILLIAM V. HOUGH
BY
Donald L Rose

3,167,559
PREPARATION OF TETRABORANE(6) ADDUCTS
William V. Hough, Gibsonia, Pa., assignor to Callery Chemical Company, Pittsburgh, Pa., a corporation of Pennsylvania
Continuation of application Ser. No. 7,278, Feb. 8, 1960. This application Mar. 1, 1963, Ser. No. 263,675
4 Claims. (Cl. 260—290)

This invention relates to a new base tetraborane(6) addition compounds, $X \cdot B_4H_6$, and to methods of preparing them.

The compounds of this invention are best considered, both in terms of structure and nomenclature, as addition compounds or adducts of a base and tetraborane(6), even though tetraborane(6) is not known to exist alone. Thus, the compound $N(CH_3)_3B_4H_6$ is considered an adduct of trimethylamine and tetraborane(6) and is called trimethylamine tetraborane(6).

It is an object of this invention to provide the new and useful tetraborane(6) adducts, $X \cdot B_4H_6$ where X is a base. Another object is to provide methods of preparing these new compounds from pentaborane(9), $B_5H_9$. Other objects of this invention will become apparent from the following specification and claims.

The new tetraborane(6) adducts described herein are prepared according to this invention by the reaction of a strong Lewis base and pentaborane(9), described by the overall equation (1) $\quad 2X + B_5H_9 \rightarrow X \cdot BH_3 + X \cdot B_4H_6$ 

where X is a base.

This overall reaction proceeds through three clearly definable steps, the first being the formation of an adduct of the base and pentaborane(9) according to (2) $\quad 2X + B_5H_9 \rightarrow 2X \cdot B_5H_9$ 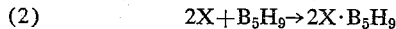

which is a rapid vigorous reaction at ordinary conditions. In the second step the adduct rearranges to form an isomer of the adduct with an as yet unidentified structure according to (3) $\quad 2X \cdot B_5H_9 \rightarrow 2X \cdot B_5H_9$ isomer 

Figure 1:
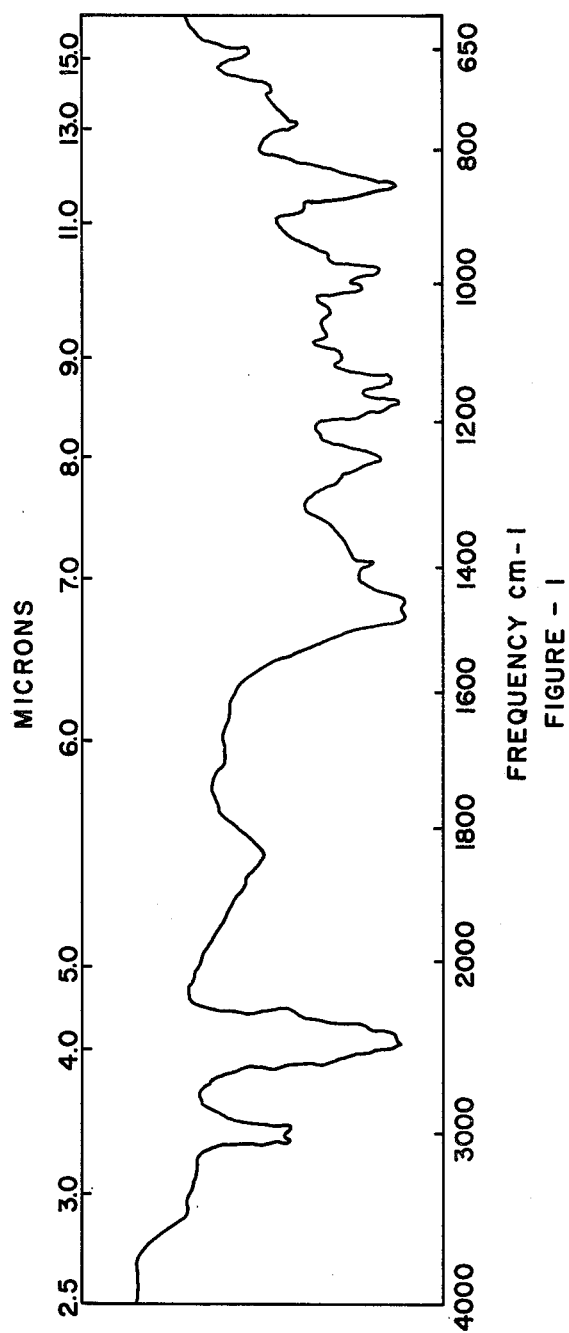
Figure 2:
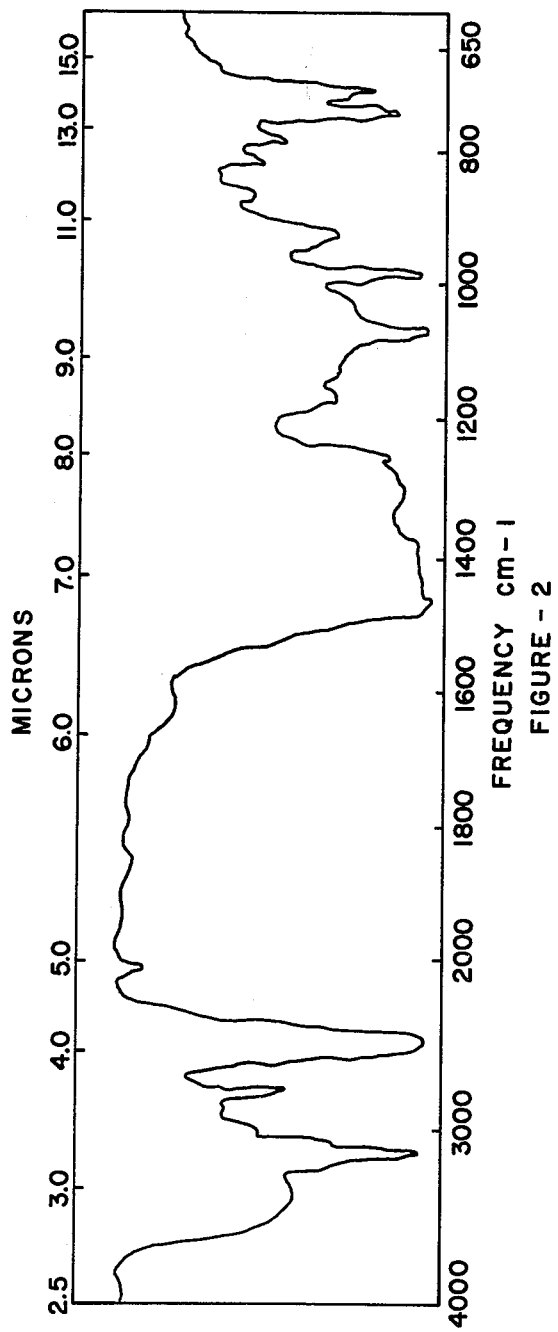

FIGURES 1 and 2 of the drawings made a part hereof show the infra red spectra of an adduct and its isomeric compound respectively. The third step is the dissociation of the isomer according to (4) $\quad 2X \cdot B_5H_9$ isomer $X \cdot BH_3 + X \cdot B_4H_6$ 

The rate of Reaction 3 is slow in comparison to Reaction 2, and the rate of Reaction 4 is slow in comparison to Reaction 3.

We have found that those bases suitable for use in this reaction are strong Lewis bases which form stable borane(3) complexes, $X \cdot BH_3$, at room temperature from reaction of the base and diborane. Such bases include, for example, alkyl tertiary amines such as trimethylamine, triethylamine, tripropylamine, and tributylamine; cyclic amines such as pyridine and lutidine, and lower alkyl phosphines such as trimethylphosphine, triethylphosphine, methyl diethylphosphine, dimethyl ethylphosphine, tripropylphosphine.

The following example is illustrative of the method of preparing the tetraborane(6) adducts. 4.00 millimols of trimethylamine and 1.95 millimols of pentaborane(9) were frozen together at $-196°$ C. in a reaction bulb under vacuum, and the bulb was sealed and warmed to room temperature. Upon warming there was an immediate reaction forming a solid product with no evolution of gaseous material. This product was shown by conventional elemental analysis and infra red spectrum analysis of similarly prepared material to be a simple adduct of the amine and pentaborane(9) with an empirical formula $2N(CH_3)_3 \cdot B_5H_9$. The solid material was permitted to stand in the sealed reaction bulb at room temperature for 48 hours, whereby a molecular rearrangement occurred forming an isomer of the adduct. The isomer has the same empirical formula but a different structure as evidenced by its different infra red spectrum. The reaction bulb was then attached to and opened into a vacuum line equipped with a $-78°$ C. sublimation tube. The isomer was subjected to a vacuum for three hours, and 1.99 millimols of trimethylamine borane(3), $N(CH_3)_3BH_3$ was sublimed into the sublimation tube. The solid nonvolatile material remaining in the reaction bulb was essentially a quantitative yield of trimethylamine tetraborane(6) having the empirical formula $N(CH_3)_3 \cdot B_4H_6$.

The base pentaborane(9) adducts form readily on contact of the base and pentaborane(9). They may be reacted at any temperature at which one of the reactants is in the fluid state; at low temperatures at which both reactants are in the solid state there is little effective contact of the reactants so the reaction is extremely slow. Ambient room temperature is most economical and convenient and is therefore preferred. The adduct forms regardless of the proportion of the reactants, although for reasons hereinafter set forth it is preferred that no more than a stoichiometric amount of the base be used.

The isomerization of the base pentaborane(9) adduct is accomplished by maintaining the adduct at about room temperature, i.e., about 20 to 30° C., for a period of at least about 1 hour. The following example is illustrative of this isomerization. 6.06 millimoles of trimethylamine and 3.01 millimoles of pentaborane(9) were frozen together at $-196°$ C. in a reaction bulb under vacuum, and the bulb was sealed and warmed to room temperature. Upon warming, there was an immediate reaction forming the adduct $2N(CH_3)_2 \cdot B_5H_9$. Within 5 minutes of reaction the infra red spectrum shown in FIGURE 1 was substantially an additive spectra of trimethylamine and pentaborane(9). After 1 hour at room temperature the adduct had isomerized. The infra red spectra of the isomer is shown in FIGURE 2. The isomerization resulted in the disappearance of B—H—B bridge bonds as shown by the disappearance of the absorption peak at 5.43 microns, and the presence of N—H bonds, as shown by the appearance of the absorption peak at 3.64 microns.

The dissociation of the isomeric $2X \cdot B_5H_9$ according to Equation 4 to produce borane(3) adduct and tetraborane(6) adduct proceeds slowly at ordinary ambient conditions. For example, isomeric $2N(CH_3)_3B_5H_9$ completely dissociates in about 100 hours at 18° C. and atmospheric pressure. The rate of dissociation may be substantially increased by increasing the temperature, decreasing the pressure, or combinations thereof. At temperatures above about 80° C. there is produced substantial amounts of unidentified solid products resulting in a loss of yield of tetraborane(6) adduct, and at still higher temperatures, e.g. 125° C., only a small amount of tetraborane(6) adduct is formed.

It is necessary to isomerize the $2X \cdot B_5H_9$ adduct before any volatile materials are removed by pumping at reduced pressure or by heating. This is essential because the $2X \cdot B_5H_9$ adduct will itself dissociate at such conditions rather than isomerize. The adduct dissociates primarily to its components, i.e. the base and pentaborane(9), and to form some base borane-3 and solid polymeric material.

The tetraborane(6) adduct may be separated from the by-product borane (3) adduct by conventional methods such as sublimation, distillation, or extraction. The borane(3) adducts of strong Lewis base are generally liquids or solids exhibiting an appreciable vapor pressure, while the tetraborane(6) adducts are substantially nonvolatile solids. The borane(3) adducts can therefore be easily separated by distillation or sublimation from the tetraborane(6) adduct.

The presence of base in excess of that coordinated in the intermediate pentaborane(9) adduct or its isomer results in a loss of yield of the desired product tetraborane(6) adduct; there is a loss of one mol of tetraborane(6) adduct for each mol of excess base. Thus while the dissociation of one mol of isomeric $2X \cdot B_5H_9$ yields one mol of tetraborane(6) adduct, a reaction mixture containing one mol of isomeric $2X \cdot B_5H_9$ and one mol of base yields no tetraborane(6) adduct. The yield of tetraborane(6) adduct is proportionately reduced with smaller excesses of the base. The mechanism of this action is not completely understood; the excess base may react with the adduct or its isomer so that tetraborane(6) adducts are never formed. Excess pentaborane(9) has no detrimental effect on the reaction.

When pentaborane(9) and base in excess of the stoichiometric amount of Equation 2 are contacted, a mixture of the adduct and base is produced. The base may generally be removed rapidly from this mixture by distillation or evaporation; however, some dissociation of the adduct occurs during the separation resulting in a loss of yield of isomeric $2X \cdot B_5H_9$ and thereby a loss of yield of tetraborane(6) adduct. For this reason it is preferred to prepare the intermediate pentaborane(9) adduct using a stoichiometric proportion of reactants or an excess of pentaborane(9).

The tetraborane(6) adducts of this invention are solids of a pale yellow to deep yellow color. They are substantially nonvolatile and exhibit exceptional thermal stability. For example, trimethylamine tetraborane(6) and trimethylphosphine tetraborane(6) remain unchanged after 12 days at 150° C. under vacuum.

The tetraborane(6) adducts exhibit a unique infra red spectra, which show the following absorption peaks: 4.00 microns, very strong; 7.08 microns, medium; 8.02 microns, weak; 9.37 microns, medium; and 10.1 microns, strong. These absorption peaks are different from those exhibited by borane(3) and triborane(7) adducts.

The tetraborane(6) compounds are oxidized rapidly by air or oxygen, even when oxygen is present only in minute concentrations. For this reason tetraborane(6) compounds are particularly useful in removing trace oxygen impurities from inert gases such as nitrogen, helium, argon and neon. For example, when nitrogen containing less than 0.1 percent of oxygen is contacted with trimethylamine tetraborane(6), the gas is immediately purified by removal of all detectable oxygen. The oxidation products of tetraborane(6) compounds are white, so that there is a color change from yellow to white to indicate the depletion of deoxygenation capacity.

The tetraborane(6) adducts are also useful as chemical intermediates and organic reducing agents. The adducts are soluble in ethers and methylene chloride, and homogenous reduction reactions are easily performed by conventional techniques.

This application is a continuation of my copending application, Serial No. 7,278, filed February 8, 1960, now abandoned, which was a continuation-in-part of my application Serial No. 799,068, filed March 13, 1959, now abandoned.

According to the provisions of the patent statutes, I have explained the principle and mode of practicing my invention, and have described what I now consider to be its best embodiments. However, I desire to have it understood that within the scope of the appended claims, the invention may be practiced otherwise than as specifically described.

I claim:
1. A method of preparing $X \cdot B_4H_6$ adducts that comprises the steps of contacting at a temperature below about 80° C. pentaborane(9) and a strong Lewis base, X, selected from the group consisting of lower alkyl tertiary amines, pyridine, lutidine, and lower alkyl phosphines, the amount of said base not exceeding about 2 mols for each mol of pentaborane(9), maintaining the reaction product at about room temperature for at least about 1 hour, and recovering $X \cdot B_4H_6$ from the reaction mixture produced thereby.
2. A compound $X \cdot B_4H_6$ where X is a strong Lewis base selected from the group consisting of lower alkyl tertiary amines, pyridine, lutidine and lower alkyl phosphines.
3. Trimethylamine tetraborane(6), $N(CH_3)_3 \cdot B_4H_6$.
4. Pyridine tetraborane(6), $C_5H_5N \cdot B_4H_6$.

References Cited in the file of this patent

Burg et al.: "Journal of the American Chemical Society," vol. 79, pages 2129–32 (1957).